United States Patent Office 3,276,943
Patented Oct. 4, 1966

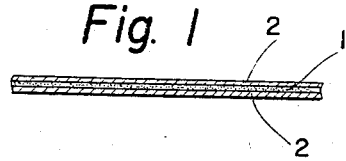
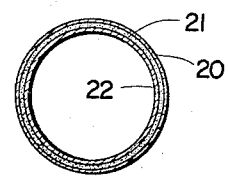
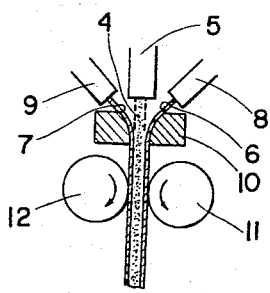
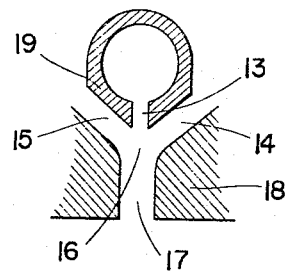
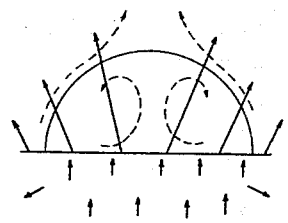
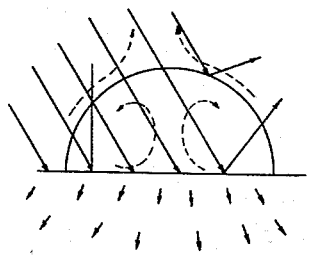
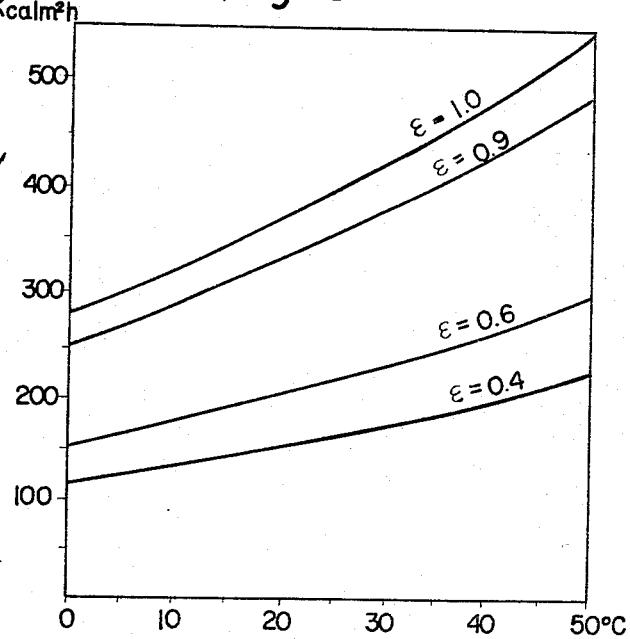

3,276,943
PLASTIC FILM FOR THERMAL INSULATION
Yuzo Kawamura, 47–102 Hamakohshien-danchi, 27 Edakawa-cho, Nishinomiya-shi, Hyogo-ken, Japan
Filed Aug. 14, 1961, Ser. No. 131,171
Claims priority, application Japan, Aug. 20, 1960, 35/35,597
4 Claims. (Cl. 161—162)

This invention relates to plastic film for thermal insulation containing metal powder such as aluminium powder, etc. at a high density and a process for the manufacture thereof. More particularly, this invention relates to plastic film for thermal insulation containing aluminium powder at a high density of 15–20%, having a high-degree reflexibility of heat rays, and also having a thickness of 0.05–0.1 mm., and a process for the manufacture thereof.

The silver plastic films hitherto used in general cannot possibly be used for the purpose of thermal insulation because the content of aluminium powder therein is but about 0.1–1.0%. Also, the silver films having the thickness of 0.1–0.15 mm. in general are able to contain only 8–10% of aluminium powder at maximum and their reflexibility, too, of heat rays is only about 40%, so that even if they are used for thermal insulation, sufficient effects cannot be expected, and, what is more, they have very little practical value even in their strength and durability.

Plastic film having a high-degree reflexibility of heat rays must contain 10–20% of aluminium powder. It is difficult, however, to blend and disperse the aluminium powder therein uniformly. Since the tension and elongation of the film both decrease to 30–50% as compared with the unblended one of the same plastic, the durability thereof is small, and such a film has no practical value.

The films of the prior art of this type, such as used for agricultural purposes to protect plant life from frost, such as the vinyl covers and black vinyl covers, recently introduced, are calculated to operate on the principle of heat absorption of sun rays. The temperature underneath the cover raises rapidly. The drawbacks of this type of cover are that, at night, the heat circulation reverses itself, the ground gives off the stored heat which the heat-conductive conventional plastic film transmit to the cold atmospheric air above it. As a result thereof, the protection against frost offered by the conventional covers is very limited and fails at extremely low temperatures when it is most needed.

The primary object of the invention is to provide a plastic cover for thermal insulation in the form of a thin film having heat reflective properties.

Another object of this invention is to provide plastic film for thermal insulation containing aluminium powder of a high density, having a high-degree reflexibility of heat rays, as well as high strength and durability, and also having a minimum thickness.

Another object of the invention is to provide a plastic film ground-cover for agricultural and gardener's use, capable of maintaining an even temperature of the ground covered by it by reflecting radiation of visible and ultraviolet rays.

Yet another object of the invention is to provide a ground covering plastic film for agricultural and gardener's usage of the type described, which is light, of minimum volume, resilient and non-absorbent.

Other objects of the invention will become apparent to those skilled in the art from the following description and annexed drawings in which:

FIG. 1 is an enlarged sectional view of a plastic film for thermal insulation of this invention;

FIG. 2 is a schematic drawing of an apparatus to be used for the manufacture of the plastic film of this invention;

FIG. 3 is an explanatory sectional view of the die part of the apparatus shown in FIGURE 2;

FIG. 4 is a drawing in section of a plastic film of this invention extruded in tubular form;

FIG. 5 is a diagrammatic view of the relationship between the temperature at the surface of the ground and the quantity of radiant heat expected lost from the surface of the ground;

FIG. 6 shows the movement of heat in the daytime at the surface of the ground; and FIG. 7 is a diagrammatic view of the movement of heat in the nighttime at the surface of the ground.

In FIG. 1 the reference character 1 denotes an intermediate layer, i.e. a plastic layer containing 15–20% of aluminium powder, the thickness thereof being about 0.01–0.025 mm., 2 are exterior layers consisting of transparent plastic of about 0.012–0.045 mm. in thickness which are joined to both sides of intermediate layer 1 as one body. Film, such as the present one, which contains a high percentage of aluminium powder and which simultaneously is very thin, is very difficult to manufacture by conventional methods using calender rollers or the flow-coating method, unless special complicated steps are employed.

The present inventor succeeded in manufacturing plastic film having such a structure shown in FIG. 1 by using an apparatus shown in FIG. 2. In FIG. 2, 4 is a plastic film layer containing 15–20% of aluminium powder extruded by an extruding machine 5; 6 and 7 are transparent plastic film layers extruded by extruding machines 8 and 9; 10 is a die; and 11 and 12 are rollers for stretching plastic film out of die 10. As seen from FIG. 2, plastic film layers 4, 6 and 7, immediately after their extrusion, are joined into an integral body with layer 4 as an intermediate layer between layers 6 and 7, while they are in a softened state, and are stretched by rollers 11 and 12 from die 10 to form a plastic film whose section is as shown in FIG. 1. FIG. 3 is a sectional view showing the structure of a die provided with three slits for extruding the respective sheets. 13 denotes the slit through which the intermediate layer 4 is extruded, and 14 and 15 are slits through which the exterior layers 6 and 7 are extruded, the three layers being joined together while in a softened state at 16 and extruded through die 17. A heating device is provided at 18 and 19, thereby maintaining a temperature at which each layer of the film is in a softened state. In FIGURE 4 the invention is demonstrated by extruding the laminated film in tubular form and thereafter cutting it longitudinally. In FIG. 4, 20 is an intermediate plastic layer containing aluminium powder, and 21 and 22 are transparent plastic layers.

Working examples of this invention are given hereunder.

Example 1

| | Parts by weight |
|---|---|
| Highly purified aluminium leaf powder (150–200 meshes) | 20 |
| Polybutene | 10 |
| Polyethylene of moderate density | 69 |
| Butyl alkylphenol | 1 |

A compound of the above was placed in the hopper 5 of the extruder of the intermediate layer, and was extruded while maintaining the temperature of the die 19 at 180–200° C.

Simultaneously a composition of:

| | Parts by weight |
|---|---|
| Polyethylene of low density | 99.9 |
| Butyl alkylphenol | 0.1 | placed in the hoppers 8 and 9 of the extruders of the exterior layer was extruded while maintaining the temperature of the die 18 at 200–220° C.

The ratio of the outputs of the extruder 5 and of the extruders 8 and 9 respectively was 1:4 to 1:5, and the total amount extruded was adjusted so as to make the thickness of the plastic film extruded from the die 0.04–0.06 mm. The weight of aluminium leaf powder in the whole film in this case was 4–5%.

*Example 2*

| | Parts by weight |
|---|---|
| Highly purified aluminium leaf powder (100–200 meshes) | 15 |
| Dioctyl phthalate | 35 |
| Polyvinyl chloride | 50 |
| Stabilizer, epoxy resin | 3 |

A compound of the above was extruded from the hopper of the extruder 5 of the intermediate layer while maintaining the temperature of the die 19 at 230–260° C.

Simultaneously a composition of:

| | Parts by weight |
|---|---|
| Polyvinyl chloride | 100 |
| Dioctyl phthalate | 30 |
| Stabilizer | 3 | was extruded from the hoppers 8 and 9 of the extruders of the exterior layers while maintaining the temperature of the die 18, at 230–260° C.

The extruding ratio of the two was 1:4 to 1:5, respectively and was adjusted so as to make the thickness of the laminated film 0.08–0.1 mm. The weight of the aluminium leaf powder in the film in this case 3–3.8%.

The aluminium powder to be used in this invention is preferably scale-like powder of a leaf having ground surface, and the plastic preferably has a high degree of transparency and a low absorption of heat rays when it is made into film.

The plastic film for thermal insulation of this invention may be use in various ways, but its practical value as a covering heat insulator for use in agriculture and gardening is great. In the following an explanation is given as to the use of the plastic film of this invention as a covering heat insulator in agriculture and gardening.

In FIG. 5 the quantity of radiant heat is shown which is lost from the surface of the ground at various rates of radiation when the temperature of the surface of the ground is 0–50° C. This value was calculated by $$Q = 4.96\ Ae(T/100)^4 Kcal/h$$

where $Q$ = quantity of radiant heat, $A$ = surface area m.$^2$, $e$ = radiation rate, and $T = °$ C. $+273$, showing the quantity of heat Kcal to be radiated per m.$^2$ per hour. The quantity of heat given by radiation from the sun in the daytime differs according to the area, but in central Japan, it is 2000 to 4000 Kcal/m.$^2$ per day in spring, and this quantity of heat is lost outwardly from the earth's surface by radiation at nighttime, thereby keeping the heat energy on the earth balanced and also keeping the average atmospheric temperature constant.

A conventional transparent or semi-transparent covering heat insulator used in agriculture and gardening takes in the radiant heat of the sun in the daytime, confining the higher ground temperature and atmospheric temperature within a fixed limit to prevent the lowering thereof due to the diffusion with the open air, thus creating within the protected area a fine atmospheric phenomenon with a temperature higher than the ground temperature and the atmospheric temperature of the dewy ground, thereby promoting the growth of crops; at night, however, this covering material transmits and absorbs the radiant heat from the surface of the ground, and, therefore, the ground temperature and atmospheric temperature in the covered compartment lower rapidly due to the cool open air. Especially, when it is cold and particularly when it freezes the crops inside the cover are not protected and thus are often subjected to damage.

There is shown in FIG. 6 the movement of the heat in the daytime, and in FIG. 7 the movement of heat in the nighttime. Long arrow lines show the rays of radiant heat and the direction thereof, dotted lines show the movement of heat due to the flow of air, and short arrow lines show the movement of underground heat. According to FIG. 6, when using conventional materials, radiant heat is absorbed in the surface of the ground and penetrates underground to raise the temperature by conductivity and convection. According to FIG. 7 the radiant heat from the surface of the ground passes through the conventional covering material and escapes to the outside, and the atmospheric temperature drops due to the cool open air contacting the covering. The underground heat comes out to the surface of the ground and is lost by the radiation and convection, thereby lowering the temperature gradually. It is for this reason that the lowest temperature is indicated early in the morning before the sunrise, and, also, that the temperature inside the covering is often lower than that of the dewy ground early in the morning. At nighttime, the surface of the dewy ground emits radiant rays, thereby lowering the temperature, and the air in contact therewith is cooled, with the result that the atmospheric temperature is cooled from the surface of the ground, causing a warm air layer, i.e. an inversion layer, at the upper stratum. Early in the morning, this inversion layer comes down due to the disorder of air current, and thereby the cool air layer at the lower stratum is heated up. In this case, the transparent or semi-transparent covering heat insulator heats up the air confined therein by the downward convection inside the compartment, but this convection is minimum and is slow. On the other hand, the inside of the covering is continuously subjected to cooling by radiation, thereby lowering the temperature gradually. Thus, the conventional transparent or semi-transparent covering heat insulators are not very effective.

In order to retain the heat at nighttime, this transparent or semi-transparent conventional heat insulating material is usually covered with straw matting, hemp bags, reed blind, etc., but because these coverings are large in volume and weight, and, also, because, when it rains, they absorb moisture, etc., much labor is required for the handling thereof; this up to present was one of the great obstacles to the operation in agriculture and gardening.

The plastic film sheet for thermal insulation employed according to this invention has a superior effect primarily by returning heat by the reflection of radiant rays; by its small volume and weight; because of its elasticity due to a superior combination of plastic and aluminium particles and because it does not absorb moisture; therefore, it is very easy to handle, and its ability to retain heat, even when the film is only 0.05 mm. thick, makes it superior also to straw matting, hemp bags, etc. hitherto used. This very thin and light film has the same effect as straw matting having a thickness of 20 mm. Because of these properties, the film sheet of this invention is advantageously used for covering the surface of the ground where crops are being grown in summer, thereby lowering the temperature of the ground, preventing the ground from becoming dry, repressing weeds from growing, and thus making it possible to promote the growth of crops.

Heretofore, black vinyl, etc. have been used in the shade culture of chrysanthemum, etc. But because of the black color which absorbs the heat of the sun's rays, the temperature inside the covering elevates, and therefore, it was impossible to obtain a good result in the color and growth of petals. However, if the plastic film sheet according to this invention is used, full shading can be accomplished, because the inside temperature does not elevate, nor does the film sheet allow visible rays and ultra-violet rays to pass through. Also, in winter when the days are short, this plastic film sheet, if placed at the north side of a nursery, promotes the growth of seedlings, thereby making it possible to produce good seedlings.

Comparative results of utilization of the plastic film of this invention and of straw matting as a covering heat insulator in agriculture are shown in the following table.

TABLE

| Classification | Straw Matting | Silver Film |
|---|---|---|
| Use for a double-tunnel inside the house. | Inconvenient; due to much moisture, it must be taken out of the house more than once a week and dried, and in the daytime, it intercepts passages. | Advantageous in keeping heat; it needs no drying, nor does it occupy much space, and the house fully admits the sun's rays. |
| Use for the mid-ceiling of a large-type house. | Unusable. | Optimum usability; no substitutes exist. |
| Use for the prevention of frosts and the promotion of growth in a large-scale culture. | Difficult or impossible in operation. | Optimum usability in the culture of strawberries, fruits and vegetables, leaf and root vegetables, petals, fruit-trees, etc.; also usable if combined with other transparent materials. |
| Use to shade culture. | Difficult to use; Black vinyl, etc. are in use, but because of high temperature, damages result. | Easy to use (no damages due to high temperature). |
| Handling in rainy weather (general tunnel culture). | Transparent materials or other rain-covers are placed on the straw matting, or it has to be taken off, collected and sheltered from the rain even at night. | Absorbs no moisture, easy to handle. |
| Status while in use. | In disorder. | In order and beautiful. |
| Covering labor. | Maximum; 4 hours per day are required per about 0.245 acre. | Minimum. |
| Storage after use. | A warehouse, approx. 10 m.², is required per about 0.245 acre. | About a chest of drawers, per about 0.245 acre. |
| Durability. | 1.5–2 years (in case of much rain, only one harvest). | More than 2–3 years. |
| Price required (per 4.0 m.²). | Y60.–Y120. (current price). | Y120.–Y200. |
| Quantity in use at present (estimate). | 150,000 tons. | |
| Estimated quantity to be used in future. | 70,000 tons. | More than 3,000 tons (60,000,000 m.²). |

What is claimed is:
1. A radiation reflecting plastic film for uses such as a thermally insulating cover for plant life in agriculture and gardening, having a minimum thickness necessary for achieving its objectives, comprising a first intermediate layer of a plastic film having therein uniformly dispersed a quantity of a metallic powder, and second and third outer layers of a transparent thermoplastic material, bonded one on each side of said first intermediate layer, said three layers forming an integrally laminated body, wherein the ratio of thickness of said first intermediate layer to the said second and third outer layers is from about 1:4 to about 1:5, wherein the weight of the metallic powder relative to the total weight of the film is about 3.8 to about 5% and wherein the thickness of the said laminated body is about 0.05 mm.

2. A radiation reflecting thermoplastic film cover for thermal insulation for plant life in agriculture and gardening, having a minimum thickness necessary for achieving its objects, comprising a first intermediate layer of a thermoplastic film, having therein uniformly dispersed a quantity of an aluminum powder, and a second and a third outer layer of transparent thermoplastic material, bonded on one each side of said first intermediate layer, said three layers forming an integrally laminated body, said intermediate layer comprising a uniformly mixed composition by weight of about 20 parts of highly purified aluminum leaf powder, about 10 parts of polybutene, about 69 parts of polyethylene and about 1 part of butyl alkylphenol, said second and said third outer layers comprising by weight about 99.9 parts of polyethylene and about 0.1 part of butyl alkylphenol, wherein the ratio of thickness of said first layer relative to said second and third layers is from about 1:4 to about 1:5 and the weight of the aluminum relative to the total weight of said laminated film is about 4 to 5%.

3. A radiation reflecting plastic film for uses such as a thermally insulating cover for plant life in agriculture and gardening, having a minimum thickness necessary for achieving its object, comprising a first intermediate layer comprising a uniformly mixed composition by weight of about 15 to 20 parts of highly purified aluminum leaf powder, about 80 to 85 parts of thermoplastic resin containing stabilizer, and a second and a third outer layer comprising by weight about 100 parts of thermoplastic resin containing stabilizer, wherein the ratio of thickness of said first layer relative to said second and third layer is from about 1:4 to about 1:5 and the weight of the aluminum relative to the total weight of said laminated film is about 3 to 5%.

4. A radiation reflecting plastic film for uses such as a thermally insulating cover for plant life in agriculture and gardening, having a minimum thickness necessary for achieving its object, comprising a first intermediate layer comprising a uniformly mixed composition by weight of about 15 parts of highly purified aluminum leaf powder, about 35 parts of dioctyl phthalate, about 50 parts of polyvinyl chloride and about 3 parts stabilizer, and a second and a third outer layer comprising by weight about 100 parts of polyvinyl chloride, about 30 parts of dioctyl phthalate, and about 3 parts of stabilizer, wherein the ratio of thickness of said first layer relative to said second and third layers is from about 1:4 to about 1:5 and the weight of the aluminum relative to the total weight of said laminated film is about 3 to 3.8%.

References Cited by the Examiner

UNITED STATES PATENTS

| | | | |
|---|---|---|---|
| 1,989,371 | 1/1935 | Land. | |
| 2,259,362 | 10/1941 | Young. | |
| 2,601,326 | 6/1952 | Rohs et al. | 47—26 |
| 2,630,573 | 3/1953 | Rand | 154—44 |
| 2,774,421 | 12/1956 | Lion | 161—220 |
| 2,799,609 | 7/1957 | Dalton | 154—53.6 |
| 2,848,591 | 8/1958 | Taylor | 119—33 |
| 2,932,323 | 4/1960 | Aries | 156—244 |
| 2,954,349 | 9/1960 | Jenness | 88—106 |
| 2,974,442 | 3/1961 | Womelsdorf | 47—26 |
| 2,993,236 | 7/1961 | Brimley et al. | 18—59 |
| 2,996,709 | 8/1961 | Pratt | 154—46 |
| 3,015,133 | 1/1962 | Nichols | 18—59 |
| 3,069,301 | 12/1962 | Buckley et al. | 161—196 |
| 3,077,428 | 2/1963 | Heuser et al. | 161—216 |
| 3,111,451 | 11/1963 | Peters | 161—216 |
| 3,118,781 | 1/1964 | Downing | 88—106 |
| 3,143,364 | 8/1964 | Klein | 161—216 |

EARL M. BERGERT, *Primary Examiner.*

MORRIS SUSSMAN, ALEXANDER H. BRODMERKEL, ALEXANDER WYMAN, *Examiners.*

K. N. VERNON, R. J. ROCHE, *Assistant Examiners.*